US012698770B2

(12) United States Patent
Chen et al.

(10) Patent No.: US 12,698,770 B2
(45) Date of Patent: Aug. 4, 2026

(54) SPHERICAL PUMP AND MOTOR ASSEMBLY

(71) Applicant: SHENZHEN SPHERICAL FLUID POWER TECHNOLOGY CO., LTD., Shenzhen (CN)

(72) Inventors: Xiaoping Chen, Shenzhen (CN); Luyi Wang, Shenzhen (CN); Yaowen Tan, Shenzhen (CN)

(73) Assignee: SHENZHEN SPHERICAL FLUID POWER TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/181,279

(22) Filed: Apr. 16, 2025

(65) Prior Publication Data

US 2026/0160248 A1 Jun. 11, 2026

Related U.S. Application Data

(63) Continuation of application No. PCT/CN2023/123380, filed on Oct. 8, 2023.

(30) Foreign Application Priority Data

Oct. 28, 2022 (CN) .......................... 202211334350.2

(51) Int. Cl.
| | |
|---|---|
| *F04C 3/06* | (2006.01) |
| *H02K 1/2786* | (2022.01) |
| *H02K 5/16* | (2006.01) |

(52) U.S. Cl.
CPC ............. *F04C 3/06* (2013.01); *H02K 1/2786* (2013.01); *H02K 5/16* (2013.01)

(58) Field of Classification Search
CPC ....... F04C 3/06–085; F04C 18/54–565; H02K 1/2786–2792
See application file for complete search history.

(56) References Cited

U.S. PATENT DOCUMENTS 2,204,760 A * 6/1940 Jensen .................... F04C 9/005
418/68
2,662,482 A * 12/1953 Paulsmeier ............... F04C 3/06
418/68
(Continued)

FOREIGN PATENT DOCUMENTS

CH 231548 A * 3/1944 ............... F04C 3/06
CN 110685970 A 1/2020
(Continued)

OTHER PUBLICATIONS

Bushing vs. Bearing—What is the Difference, by Tameson, published May 9, 2022, URL: https://tameson.com/pages/bushing-bearing. (Year: 2022).*

*Primary Examiner* — Thomas Fink

(57) ABSTRACT

A spherical pump and motor assembly, including a spherical pump with a rotary disc shaft and an outer rotor motor. The outer rotor motor includes an outer rotor and a stator. The outer rotor has a rotor main body, which is cylindrical and upward-opening. A magnetic ring is arranged on an inner periphery of the rotor main body. A rotor central shaft is provided at a bottom center of the rotor main body. The stator includes a bracket with a central shaft hole. Multiple coil windings are arranged on an outer periphery of the bracket. An upper end of the bracket is configured to protrude out of upper ends of the coil windings to form a connection portion fixedly connected to a cylinder body seat. A lower end of the rotary disc shaft is engaged with an upper end of the rotor central shaft for torque transmission.

7 Claims, 10 Drawing Sheets

A-A sectional view

(56)  References Cited

U.S. PATENT DOCUMENTS

| | | | | |
|---|---|---|---|---|
| 2,718,351 A * | 9/1955 | Kirkpatrick | ............... | F04C 3/06 |
| | | | | 418/207 |
| 6,073,505 A * | 6/2000 | Yuda | ........................ | F16D 3/74 |
| | | | | 403/372 |
| 8,777,595 B2 * | 7/2014 | Arnold | .................... | F04C 23/02 |
| | | | | 417/410.4 |
| 2006/0263228 A1 * | 11/2006 | Arnold | .................... | F04C 3/085 |
| | | | | 418/60 |
| 2007/0253851 A1 * | 11/2007 | Arnold | ...................... | F01C 3/08 |
| | | | | 418/21 |
| 2008/0219876 A1 * | 9/2008 | Arnold | ............... | F04C 15/0073 |
| | | | | 418/206.7 |
| 2010/0233000 A1 * | 9/2010 | Arnold | ................. | F01C 21/005 |
| | | | | 418/21 |
| 2011/0200474 A1 * | 8/2011 | Dalziel | ................ | F04C 27/001 |
| | | | | 418/51 |
| 2013/0052061 A1 * | 2/2013 | Li | ........................ | F04D 25/0646 |
| | | | | 417/423.7 |
| 2023/0029836 A1 * | 2/2023 | Wang | ........................ | A23G 9/20 |
| 2025/0129778 A1 * | 4/2025 | Sereda-Mohr | .......... | F01C 21/08 |

FOREIGN PATENT DOCUMENTS

| | | | | | |
|---|---|---|---|---|---|
| CN | 111835173 | A | 10/2020 | | |
| CN | 112701827 | A | 4/2021 | | |
| CN | 216922481 | U | 7/2022 | | |
| CN | 115912724 | A | 4/2023 | | |
| CN | 218920093 | U | 4/2023 | | |
| DE | 102017200708 | A1 * | 7/2018 | ............ | F04C 15/008 |
| WO | WO-2005024236 | A1 * | 3/2005 | ............. | F01C 1/082 |
| WO | 2010018053 | A2 | 2/2010 | | |

* cited by examiner

A-A sectional view

D-D sectional view

181

SPHERICAL PUMP AND MOTOR ASSEMBLY

CROSS-REFERENCE TO RELATED APPLICATIONS

This application is a continuation of International Patent Application No. PCT/CN2023/123380, filed on Oct. 8, 2023, which claims the benefit of priority from Chinese Patent Application No. 202211334350.2, filed on Oct. 28, 2022. The content of the aforementioned application, including any intervening amendments thereto, is incorporated herein by reference in its entirety.

TECHNICAL FIELD

This application relates to fluid pumps, and more particularly to a spherical pump and motor assembly.

BACKGROUND

Spherical pump technology is an emerging variable-capacity power mechanism with a novel working principle, for which several Chinese patents have been granted. This technology is characterized by fewer pump components, reliable sealing, absence of inlet and outlet valves, high-speed operation and low noise, and is suitable for ultra-miniaturization. Chinese patent application No. 202220285836.0, titled "Miniature Spherical Pump", discloses a miniature spherical pump has compact size and light weight, making it suitable for application scenarios with strict requirement for pump size, such as dental irrigators, electric toothbrushes with rinsing functions and portable fire-fighting facilities. Compared with other conventional pumps, the spherical pump has a significantly reduced size. However, there is still a lack of a motor in the prior art which is compatible with the spherical pump in terms of size. Therefore, it is urgently needed to achieve the motor miniaturization to make full use of the spherical pump in the field of portable devices.

SUMMARY

An object of the disclosure is to provide a spherical pump and motor assembly, in which a novel spherical pump and a motor compatible therewith are integrally designed, thereby minimizing the overall size of the spherical pump and motor combination.

Technical solutions of the present disclosure are described as follows.

A spherical pump and motor assembly, comprising:

a spherical pump; and an outer rotor motor;

wherein the spherical pump is provided with a rotary disc shaft; a cylinder body seat is provided at a lower portion of the spherical pump;

the cylinder body seat is provided with a center hole, and the center hole is configured as a rotational support for the rotary disc shaft;

the outer rotor motor comprises an outer rotor; the outer rotor comprises a rotor main body, which is cylindrical and upward-opening; a magnetic ring is arranged on an inner periphery of the rotor main body; and a rotor central shaft is provided at a center of a bottom surface of the rotor main body;

the outer rotor motor further comprises a stator; the stator comprises a stator bracket with a central shaft hole; and a plurality of coil windings composed of a coil and a magnet are arranged on an outer periphery of the stator bracket;

the rotor central shaft is fitted into the central shaft hole of the stator bracket to form a rotational pair;

the stator bracket and the plurality of coil windings are provided in an annular space between the rotor central shaft and the magnetic ring;

an upper end of the stator bracket is configured to protrude out of upper ends of the plurality of coil windings to form a connection portion;

the cylinder body seat is fixedly connected to the connection portion;

the rotary disc shaft is configured to be coaxial with the rotor central shaft; and a lower end of the rotary disc shaft is engaged with an upper end of the rotor central shaft for torque transmission.

In some embodiments, the connection portion is configured as a cylindrical groove opening upward;

an outer periphery of the cylinder body seat is configured to fit an inner periphery of the connection portion; and the cylinder body seat is provided in the connection portion to form an interference fit, such that the spherical pump is fixedly connected to the stator bracket.

In some embodiments, a bushing is provided at a mating portion between the central shaft hole of the stator bracket and the rotor central shaft; and the bushing is configured as a rotational support for the rotor central shaft.

In some embodiments, the bushing comprises an upper section and a lower section; an inner diameter of the bushing is smaller than a diameter of the central shaft hole of the stator bracket; the bushing is configured to be pre-embedded in the central shaft hole of the stator bracket; and the bushing is made of copper or other wear-resistant materials.

In some embodiments, the lower end of the rotary disc shaft is provided with a first semi-cylindrical shaft head; the upper end of the rotor central shaft is provided with a second semi-cylindrical shaft head fitting the first semi-cylindrical shaft head; and the lower end of the rotary disc shaft is rotatably connected to the upper end of the rotor central shaft through engagement between the first semi-cylindrical shaft head and the second semi-cylindrical shaft head.

In some embodiments, an outer periphery of an engagement portion between the rotary disc shaft and the rotor central shaft is provided with a sleeve in a cylindrical shape; and the sleeve is fixedly sleeved on an outer periphery of the first semi-cylindrical shaft head, or fixedly sleeved on an outer periphery of the second semi-cylindrical shaft head.

In some embodiments, the lower end of the rotary disc shaft is configured as a first cylindrical shaft head; the upper end of the rotor central shaft is configured as a second cylindrical shaft head; and a sleeve is provided on an outer periphery of an engagement portion between the lower end of the rotary disc shaft and the upper end of the rotor central shaft;

the sleeve is configured to be held on the first cylindrical shaft head and the second cylindrical shaft head through an interference fit; and the lower end of the rotary disc shaft is in rotatable fit with the upper end of the rotor central shaft through the sleeve.

In some embodiments, the spherical pump comprises a cylinder body and a cylinder cover;

the cylinder body is fixedly connected to the cylinder cover by ultrasonic welding, screw connection, adhesive bonding or a clamp to form a spherical cavity; and the clamp is made of a metal or a heat-shrinkable plastic.

In some embodiments, the outer rotor motor comprises a protection casing; an upper end of the protection casing is provided with an opening; and the opening is sealedly and fixedly connected to an outer periphery of the connection portion.

In some embodiments, the protection casing is cylindrical;

a positioning ring is provided between an inner periphery of the opening of the protection casing and the outer periphery of the connection portion;

the positioning ring is sealedly and fixedly connected to the inner periphery of the protection casing and the outer periphery of the connection portion, respectively; and an upper end of the positioning ring is configured to fit a lower end of the cylinder body in shape.

Compared to the prior art, the present disclosure has the following beneficial effects.

(1) The spherical pump is matched with the compact outer rotor motor. The stator bracket is configured to protrude out of the outer rotor motor to form the connection portion. An embedded structure is provided at the connection portion to reduce an axial dimension of the connection between the spherical pump and the outer rotor motor. As a result, a pump-motor unit formed by combining the spherical pump and the outer rotor motor has a small volume and a compact structure, making it suitable for various application scenarios with strict volume requirements, thereby fully utilizing the advantage of the spherical pump's small size.

(2) The cylinder body seat at the lower end of the spherical pump is configured to fit the connection portion of the outer rotor motor through an interference fit, eliminating the need for additional connecting components and enabling assembly with a light press. After installation, the rotor central shaft is directly engaged with the rotary disc shaft of the spherical pump, facilitating convenient connection and installation of the spherical pump and the outer rotor motor. This configuration improves assembly efficiency, ensures high installation accuracy and reduces motor power loss.

In the figures: 1—spherical pump; 11—cylinder cover; 111—water inlet port; 112—water outlet port; 113—slipper seat hole; 114—water inlet groove; 115—water outlet groove; 12—cylinder body; 121—cylinder body seat; 13—retaining ring; 14—sealing ring; 15—rotary disc; 151—rotary disc shaft; 152—rotary disc pin seat; 16—O-ring; 17—piston; 171—slipper; 172—piston pin seat; 18—slipper seat; 181—sliding groove; 19—clamp; 100—working cavity; 2—outer rotor motor; 21—protection casing; 22—positioning ring; 23—outer rotor; 231—rotor main body; 232—rotor central shaft; 233—magnetic ring; 24—stator; 241—coil winding; 242—stator bracket; 243—connecting portion; 25—bushing; and 3—sleeve.

DETAILED DESCRIPTION OF EMBODIMENTS

The technical solutions of the present disclosure will be described in further detail below with reference to the accompanying drawings and embodiments. It should be noted that the described embodiments are merely illustrative, and are not intended to limit the disclosure.

Figure 1:
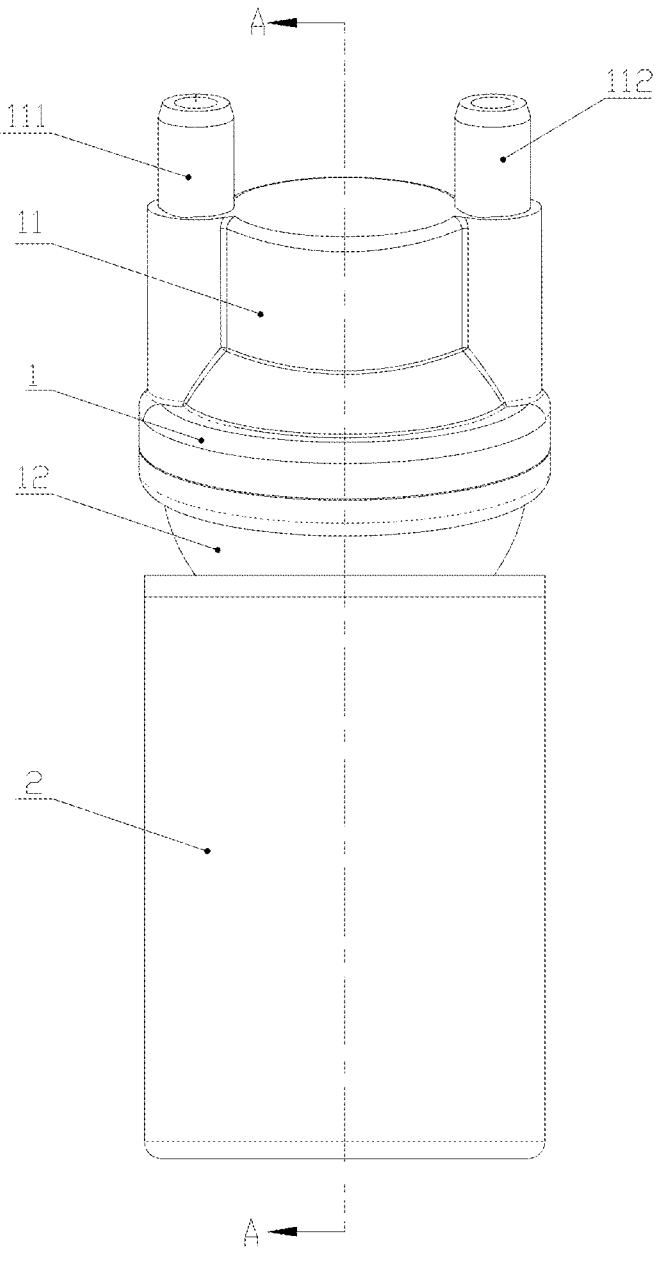
FIG. 1 is an external structural diagram of a spherical pump and motor assembly according to an embodiment of the present disclosure.
Figure 2:
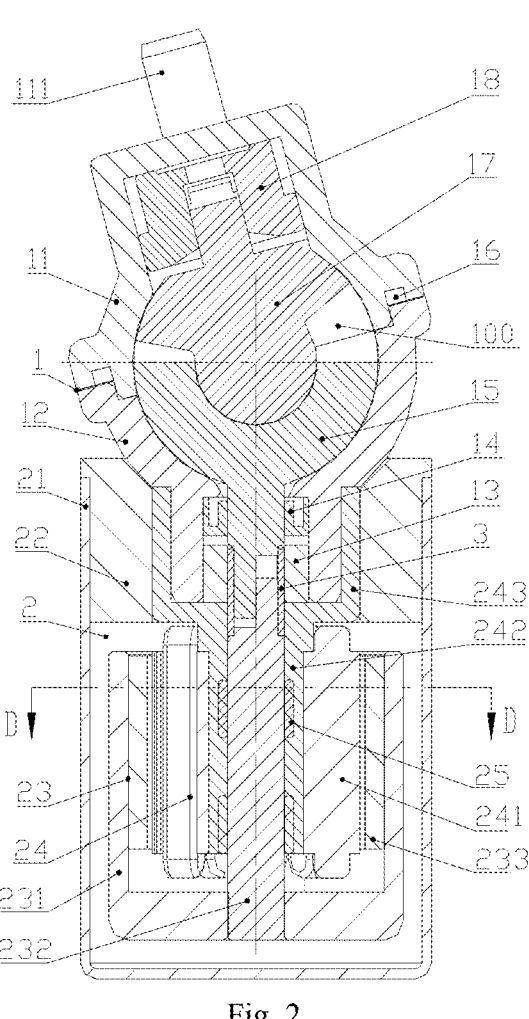
FIG. 2 is a sectional view of the spherical pump and motor assembly along an A-A line in FIG. 1.
Figure 3:
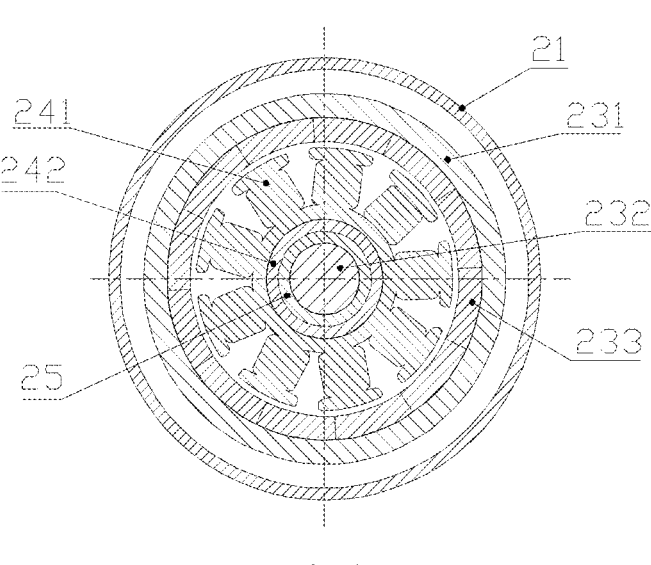
FIG. 3 is a sectional view of the spherical pump and motor assembly along a D-D line in FIG. 2.
Figure 6:
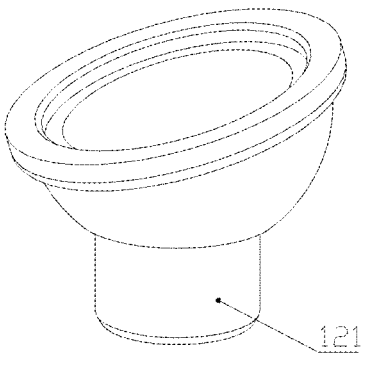
FIG. 6 is a perspective view of a cylinder body according to an embodiment of the present disclosure.
Figure 10:
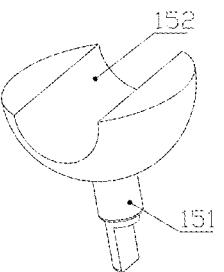
FIG. 10 is a perspective view of a rotary disc according to an embodiment of the present disclosure.

As shown in FIGS. 1-3, an embodiment of the present disclosure provides a spherical pump and motor assembly, which can serve as a power unit in a dental irrigator. The spherical pump and motor assembly includes a spherical pump 1 and an outer rotor motor 2. The spherical pump 1 is provided with a rotary disc shaft 151 configured as a power input shaft of the spherical pump 1. A cylinder body seat 121 is provided at a lower portion of the spherical pump 1. The cylinder body seat 121 is provided with a center hole, which configured as a rotational support for the rotary disc shaft 151. As shown in FIGS. 6 and 10, the spherical pump 1 includes a cylinder body 12. The cylinder body seat 121 is provided at a lower end of the cylinder body 12, and is cylindrical and configured to protrude from the lower end of the cylinder body 12. The cylinder body seat 121 is configured as a rotational support for the rotary disc shaft 151 and a connecting part between the spherical pump 1 and the outer rotor motor 2.

In the present disclosure, the outer rotor motor 2 is structurally designed to adapt to the spherical pump 1 while meeting its electrical performance requirements, taking into account the volume constraints of the spherical pump 1. The outer rotor motor 2 includes an outer rotor 23, a stator 24 and a protection casing 21. The outer rotor 23 includes a rotor main body 231, which is cylindrical and upward-opening. A magnetic ring 233 composed of a plurality of magnets is fixedly arranged on an inner periphery of the rotor main body 231. A rotor central shaft 232 is provided at a center of a bottom surface of the rotor main body 231. The magnetic ring 233 and the rotor central shaft 232 are configured to rotate synchronously in conjunction with the rotor main body 231. The stator 24 includes a stator bracket 242 and a plurality of coil windings 241 composed of a coil and a magnet. The plurality of coil windings 241 are arranged on an outer periphery of the stator bracket 242. In this embodiment, the number of the plurality of coil windings 241 is 9, the 9 coil windings are evenly arranged on the outer periphery of the stator bracket 242, thereby forming the stator 24. A central shaft hole penetrating vertically is provided at a center of the stator bracket 242. A lower end the rotor central shaft 232 is fitted into the central shaft hole of the stator bracket 242. The stator bracket 242 and the coil windings

241 are provided in an annular space between the rotor central shaft 232 and the magnetic ring 233. An outer diameter of the rotor central shaft 232 is configured to match a diameter of the central shaft hole of the stator bracket 242, thereby forming a rotational pair within the central shaft hole of the stator bracket 242.

An upper end of the stator bracket 242 is configured to protrude out of upper ends of the plurality of coil windings 241 to form a connection portion 243. The connection portion 243 is configured as a cylindrical groove opening upward for connecting the spherical pump 1. An outer periphery of the cylinder body seat 121 is configured to fit an inner periphery of the connection portion 243. The cylinder body seat 121 is provided in the connection portion 243 to form an interference fit, such that the spherical pump 1 is fixedly connected to the stator bracket 242 of the outer rotor motor 2. The connection portion 243 can be fixedly connected to the upper end of the stator bracket 242 as a separate component or integrally formed with the stator bracket 242 as an upwardly extending portion thereof. After the cylinder body seat 121 is fixedly connected to the connection portion 243, the rotary disc shaft 151 is configured to be coaxial with the rotor central shaft 232. A lower end surface of the rotary disc shaft 151 is engaged with an upper end surface of the rotor central shaft 232 for torque transmission, thereby enabling the outer rotor motor 2 to drive the spherical pump 1 to operate.

Figure 7:
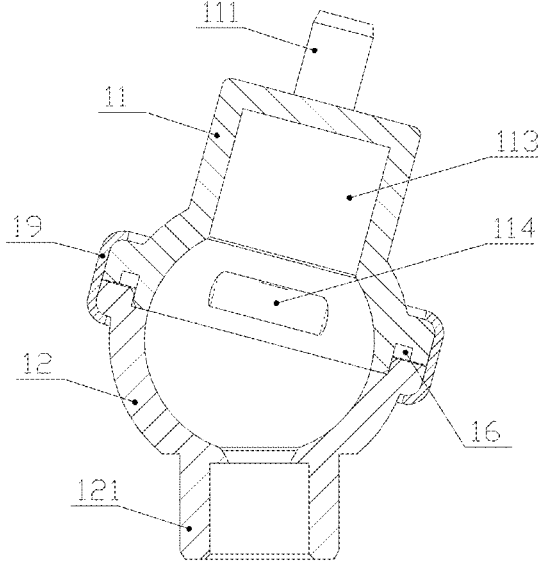
FIG. 7 structurally shows a fixed connection between the cylinder body and the cylinder cover by a clamp according to an embodiment of the present disclosure.

The lower end surface of the rotary disc shaft 151 and the upper end surface of the rotor central shaft 232 can be engaged in various ways. The connection can be achieved through an internal spline, where external splines and internal splines are respectively provided on the lower end surface of the rotary disc shaft 151 and the upper end surface of the rotor central shaft 232, forming a spline engagement connection. Alternatively, a square shaft head and a square hole engagement connection can be used. In this embodiment, a semi-cylindrical shaft head is adopted for torque transmission. As shown in FIG. 7, a first semi-cylindrical shaft head is provided at a lower end of the rotary disc shaft 151. A second semi-cylindrical shaft head fitting the first semi-cylindrical shaft head is provided at an upper end of the rotor central shaft 232. The rotary disc shaft 151 is configured to engage with the rotor central shaft 232 through flat shaft portions of the first semi-circular shaft head and the second semi-cylindrical shaft head, forming a rotational connection for torque transmission. To ensure the semi-cylindrical shaft head connection is accurate and reliable, an outer periphery of an engagement portion between the rotary disc shaft 151 and the rotor central shaft 232 is provided with a sleeve 3 in a cylindrical shape. The sleeve 3 is fixedly sleeved on an outer periphery of the first semi-cylindrical shaft head, or fixedly sleeved on an outer periphery of the second semi-cylindrical shaft head. In some embodiments, the lower end of the rotary disc shaft 151 is rotatably connected to the upper end of the rotor central shaft 232 via the sleeve 3 through an interference fit, where the lower end of the rotary disc shaft 151 is configured as a first cylindrical shaft head and the upper end of the rotor central shaft 232 is configured as a second cylindrical shaft head. In this connection manner, the lower end of the rotary disc shaft 151 and the upper end of the rotor central shaft 232 do not require the formation of semi-cylindrical shaft heads, resulting in a simpler connection method and more convenient operation.

To reduce rotational friction, lower power consumption and minimize wear between the rotor central shaft 232 and the central shaft hole of the stator bracket 242, a bushing 25 is provided at a mating portion between the central shaft hole of the stator bracket 242 and the rotor central shaft 232. The bushing 25 is configured as a rotational support for the rotor central shaft 232. The bushing 25 is made of copper or other wear-resistant materials. The bushing 25 includes an upper section and a lower section. An inner diameter of the bushing 25 is slightly smaller than a diameter of the central shaft hole of the stator bracket 242. The bushing 25 can be pre-embedded in the central shaft hole of the stator bracket 242.

To prevent water ingress into the outer rotor motor 2 and provide safety protection, the outer rotor motor 2 further includes the protection casing 21. An upper end of the protection casing 21 is provided with an opening. The opening is sealedly and fixedly connected to an outer periphery of the connecting portion 243. Furthermore, the protection casing 21 is cylindrical, similar to a water bucket. A first positioning ring 22 is provided between an inner periphery of the opening of the protection casing 21 and the outer periphery of the connecting portion 243. The first positioning ring 22 is sealedly and fixedly connected to the inner periphery of the protection casing 21 and the outer periphery of the connection portion 243, respectively. In practical production, the first positioning ring 22 is configured to be held on between the inner periphery of the opening of the protection casing 21 and the outer periphery of the connecting portion 243 through an interference fit. A shape of an upper end of the first positioning ring 22 is configured to fit an arc shape of the lower end of the cylinder body 12.

In this embodiment, the spherical pump 1 adopts a micro spherical pump. As shown in FIGS. 2 and 4-10, the spherical pump 1 includes a cylinder cover 11, a cylinder body 12, a rotary disc 15, a piston 17 and a slipper seat 18. The cylinder cover 11 has a first hemispherical inner cavity. The cylinder body 12 has a second hemispherical inner cavity. The cylinder body 12 is fixedly connected to the cylinder cover 11 to form a spherical cavity. A slipper seat hole 113, a water inlet groove 114 and a water outlet groove 115 are provided in the first hemispherical inner cavity of the cylinder cover 11. A water inlet port 111 and a water outlet port 112 are provided on an outer wall of an upper end of the cylinder cover 11. The water inlet port 111 is communicated with the water inlet groove 114, and the water outlet port 112 is communicated with the water outlet groove 115. The water inlet port 111 is connected to a water tank of the dental irrigator. The water outlet port 112 is connected to a nozzle of the dental irrigator. The slipper seat hole 113 is arranged at a spherical center of the first hemispherical inner cavity. An axis of the slipper seat hole 113 is perpendicular to an end surface of the first hemispherical inner cavity of the cylinder cover 11. A second positioning ring is configured to protrude from the end surface of the first hemispherical inner cavity to facilitate alignment when connected to an end surface of the cylinder body 12.

Figure 8:
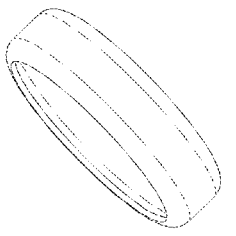
FIG. 8 is a perspective view of the clamp according to an embodiment of the present disclosure.

The lower end of the cylinder body 12 is fixedly connected to the cylinder body seat 121. The cylinder body seat 121 is integrally formed with the cylinder body 12. The cylinder body seat 121 is provided with the center hole. The center hole is configured to extend from the second hemispherical inner cavity of the cylinder body 12 to an exterior of the cylinder body 12. The center hole is configured as the rotational support for the rotary disc shaft 151. An angle $\alpha$ is formed between an axis of the center hole and an end surface of the second hemispherical inner cavity, where $\alpha$ is 5-20°. In this embodiment, $\alpha$ is preferably selected as 15°. Positioning structures and connecting flanges are provided on the end surfaces of the first hemispherical inner cavity and the second hemispherical inner cavity. The second positioning ring is provided on the end surface of the cylinder cover 11, while a corresponding positioning groove is formed on the end surface of the cylinder body 12. An O-ring 16 is provided at a junction connection between the end surface of the cylinder body 12 and the end surface of the cylinder cover 11. The cylinder body 12 and the cylinder cover 11 can be fixedly connected by a screw, or they can be positioned by the positioning structure and fixed by ultrasonic welding. Alternatively, they can be fixed using adhesive bonding. As shown in FIGS. 1-2, the cylinder body 12 and the cylinder cover 11 can be fixed using ultrasonic welding or adhesive bonding methods. As shown in FIGS. 7-8, the cylinder body 12 and the cylinder cover 11 can be connected by a clamp 19. The structures of the cylinder body 12 and the cylinder cover 11 remains unchanged from the previous description, but the clamp 19 is added. Before installation, the clamp 19 is cylindrical in shape. A diameter of an inner periphery of the clamp is configured to fit a diameter of an outer periphery of a connecting flange at a connection between the cylinder body 12 and the cylinder cover 11. During installation, the inner periphery of the clamp 19 is clamped onto the outer periphery of the connecting flange at the connection between the cylinder body 12 and the cylinder cover 11. Then, the clamp 19 is crimped at upper and lower sides of the connecting flange to form a flanged edge. During the crimping process, a contraction force is generated to fix the cylinder body 12 and the cylinder cover 11. As shown in FIG. 8, the clamp 19 has the flanged edge structure. In some embodiments, the clamp 19 can be made from a metal material. After fabrication, the metal clamp 19 is assembled onto the outer periphery of the connecting flange at the connection between the cylinder body 12 and the cylinder cover 11. Then, the clamp 19 is crimped at the upper and lower sides of the connecting flange to form the flanged edge. In some embodiments, the clamp 19 can be made from a heat-shrink material. After fabrication, the heat-shrinkable clamp 19 is applied, the material deforms and contracts as the temperature decreases. This automatic contraction forms a constriction at the upper and lower sides of the connecting flange, thereby securely locking the connecting flange to fixing the cylinder body 12 and cylinder cover 11 together. To further enhance the sealing performance at the connection between the cylinder body 12 and the cylinder cover 11, a layer of sealant can be applied to an inner side of the clamp 19 before it is fixed.

Figure 9:
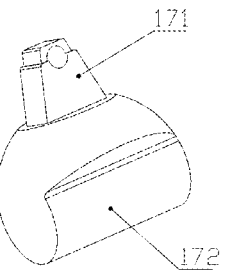
FIG. 9 is a perspective view of a piston according to an embodiment of the present disclosure.

As shown in FIG. 2 and FIG. 9, the piston 17 has a spherical surface and two side surfaces forming a certain angle. A piston pin seat 172 is provided at a lower portion of the two side surfaces of the piston 17. A slipper 171 is configured to protrude from a center of the spherical surface of the piston 17. The piston pin seat 172 is provided below the spherical surface of the piston 17. The piston pin seat 172 is configured as a semi-cylindrical structure protruding from the two side surfaces of the piston 17. Two ends of the piston pin seat 172 are configured as spherical surfaces. The slipper 171 has two flat surfaces, which configured as working surfaces. The two flat surfaces of the slipper 171 are symmetrically arranged on two sides of an axis of the piston pin seat 172. The axis of the piston pin seat 172 is parallel to the two flat surfaces of the slipper 171. In some embodiments, the two flat surfaces are parallel to each other.

As shown in FIGS. 2 and 10, the upper end of the rotary disc 15 is configured as a flat surface. A semi-cylindrical hole is configured to be recessed inward on the flat surface of the rotary disc 15 to form a rotary disc pin seat 152. The rotary disc shaft 151 is configured to protrude from a center of a lower portion of the rotary disc 15. A rotary disc spherical surface is formed between an upper end surface of the rotary disc 15 and a lower end of the rotary disc shaft 151. The rotary disc pin seat 152 is configured to fit the piston pin seat 172. The piston pin seat 172 is fitted into the rotary disc pin seat 152 to form a C-shaped cylindrical hinge structure.

Figure 4:
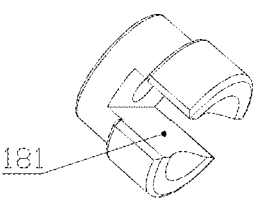
FIG. 4 is a perspective view of a slipper seat according to an embodiment of the present disclosure.
Figure 5:
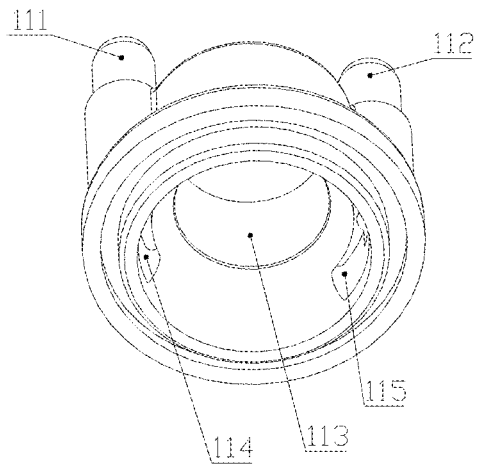
FIG. 5 is a perspective view of a cylinder cover according to an embodiment of the present disclosure.

As shown in FIG. 4, the slipper seat 18 is cylindrical. A lower end surface of the slipper seat 18 is provided with a sliding groove 181. A width of the sliding groove 181 is configured to fit a distance between the two parallel flat surfaces of the slipper 171. A length of the sliding groove 181 is designed to allow the slipper 171 to reciprocate within the sliding groove 181 as the rotary disc shaft 151 completes one full rotation. The length of the sliding groove 181 may either extend through the lower end surface of the slipper seat 18 or terminate without passing through, provided that the length is sufficient for the slipper 171 to slide reciprocally. A diameter of an outer periphery of the slipper seat 18 is configured to fit a diameter of the slipper seat hole 113. The slipper seat 18 is provided within the slipper seat hole 113, such that the lower end surface of the slipper seat 18 does not protrude beyond a spherical surface of the spherical cavity. The slipper seat 18 is configured to be coaxial with the slipper seat hole 113, allowing the slipper seat 18 to freely rotate with respect to its axis within the slipper seat hole 113. To facilitate installation and reduce friction between an upper end surface of the slipper seat 18 and a bottom surface of the slipper seat hole 113, a processing groove is provided on the upper end surface of the slipper seat 18. Furthermore, a through hole is formed between the processing groove and a bottom of the sliding groove 181 to simplify installation.

A retaining ring 13 and a sealing ring 14 are provided at a mating surface between the rotary disc shaft 151 and the center hole of the cylinder body seat 121. The rotary disc shaft 151 is configured as a stepped shaft to fit the corresponding stepped center hole of the cylinder body seat 121. The sealing ring 14 is arranged on an upper journal of the rotary disc shaft 151 to prevent water from entering the outer rotor motor 2. The retaining ring 13 is configured to restrict movement of the sealing ring 14 and to form a rotational support. A semi-cylindrical shaft head or a cylindrical shaft head is provided at the lower end of the rotary disc shaft 151 for connection with an output shaft of a power mechanism to transmit power.

The axis of the slipper seat hole 113 in the first hemispherical inner cavity and the axis of the center hole of the cylinder body seat 121 are configured to pass through the spherical center of the spherical cavity. The angle α is formed between the axis of the slipper seat hole 113 and the axis of the center hole of the cylinder body seat 121. The piston 17 and the rotary disc 15 are connected by a cylindrical hinge and provided within the spherical cavity. The spherical surface of the piston 17, the spherical surface of the rotary disc 15 and the spherical cavity have the same spherical center and form a sealing dynamic fit, with each mating surface of the cylindrical hinge also forming the sealing dynamic fit. The slipper 171 at the upper end of the piston 17 is fitted into the sliding groove 181 on the lower end surface of the slipper seat 18. Two flat surfaces of the slipper 171 are in sliding contact with two side surfaces of the sliding groove 181, forming a sliding fit. The slipper 171 is configured to reciprocate within the sliding groove 181, forming a sliding groove swing mechanism. When the rotary disc shaft 151 is driven to rotate, the piston 17 and the rotary disc 15 are configured to swing relative to each other around the cylindrical hinge, thereby causing the slipper 171 to reciprocate within the sliding groove 181. Two working cavities 100 with alternating varying volumes are formed between the upper end surface of the rotary disc 15, the two side surfaces of the piston 17 and the spherical cavity.

In this embodiment, an inner diameter of the spherical cavity of the spherical pump 1 is 13 mm. An outer diameter of the spherical pump 1 is 19 mm. The outer rotor motor 2 has an outer diameter of 19 mm. A length of the spherical pump and motor assembly provided herein does not exceed 51 mm. As a result, a pump-motor unit formed by combining the spherical pump 1 and the outer rotor motor 2 achieves a more compact size, significantly reducing the dimensions of the oral irrigator when applied to such a product, thereby greatly enhancing its quality.

Described above are merely preferred embodiments of the present disclosure, and are not intended to limit the scope of the present disclosure. It should be understood that various modifications, changes and replacements made by those skilled in the art without departing from the spirit of the disclosure shall fall within the scope of the present disclosure defined by the appended claims.

What is claimed is:

1. A spherical pump and motor assembly, comprising:
a spherical pump; and
an outer rotor motor;
wherein the spherical pump is provided with a rotary disc shaft; a cylinder body seat is provided at a lower portion of the spherical pump;
the cylinder body seat is provided with a center hole, and the center hole is configured as a rotational support for the rotary disc shaft;
the outer rotor motor comprises an outer rotor; the outer rotor comprises a rotor main body, which is cylindrical and upward-opening; a magnetic ring is arranged on an inner periphery of the rotor main body; and a rotor central shaft is provided at a center of a bottom surface of the rotor main body;
the outer rotor motor further comprises a stator; the stator comprises a stator bracket with a central shaft hole; and a plurality of stator teeth are arranged on an outer periphery of the stator bracket, and a plurality of coil windings are arranged on the plurality of stator teeth, respectively;
the rotor central shaft is fitted into the central shaft hole of the stator bracket to form a rotational pair;
the stator bracket and the plurality of coil windings are provided in an annular space between the rotor central shaft and the magnetic ring;
an upper end of the stator bracket is configured to protrude out of upper ends of the plurality of coil windings to form a connection portion;
the cylinder body seat is fixedly connected to the connection portion;
the rotary disc shaft is configured to be coaxial with the rotor central shaft;
a lower end of the rotary disc shaft is engaged with an upper end of the rotor central shaft for torque transmission;
the spherical pump comprises a cylinder body and a cylinder cover;
the cylinder body is fixedly connected to the cylinder cover by ultrasonic welding, screw connection, adhesive bonding or a clamp to form a spherical cavity;
the clamp is made of a metal or a heat-shrinkable plastic;

the outer rotor motor comprises a protection casing; an upper end of the protection casing is provided with an opening; and the opening is sealedly and fixedly connected to an outer periphery of the connection portion;
the protection casing is cylindrical;
a positioning ring is provided between an inner periphery of the opening of the protection casing and the outer periphery of the connection portion;
the positioning ring is sealedly and fixedly connected to the inner periphery of the protection casing and the outer periphery of the connection portion, respectively; and
an upper end of the positioning ring is configured to fit a lower end of the cylinder body in shape.

2. The spherical pump and motor assembly according to claim 1, wherein the connection portion is configured as a cylindrical groove opening upward;
an outer periphery of the cylinder body seat is configured to fit an inner periphery of the connection portion; and
the cylinder body seat is provided in the connection portion to form an interference fit, such that the spherical pump is fixedly connected to the stator bracket.

3. The spherical pump and motor assembly according to claim 1, wherein a bushing is provided at a mating portion between the central shaft hole of the stator bracket and the rotor central shaft; and the bushing is configured as a rotational support for the rotor central shaft.

4. The spherical pump and motor assembly according to claim 3, wherein the bushing comprises an upper section and a lower section; an inner diameter of the bushing is smaller than a diameter of the central shaft hole of the stator bracket; the bushing is configured to be pre-embedded in the central shaft hole of the stator bracket; and the bushing is made of copper or other wear-resistant materials.

5. The spherical pump and motor assembly according to claim 1, wherein the lower end of the rotary disc shaft is provided with a first semi-cylindrical shaft head; the upper end of the rotor central shaft is provided with a second semi-cylindrical shaft head fitting the first semi-cylindrical shaft head; and the lower end of the rotary disc shaft is rotatably connected to the upper end of the rotor central shaft through engagement between the first semi-cylindrical shaft head and the second semi-cylindrical shaft head.

6. The spherical pump and motor assembly according to claim 5, wherein an outer periphery of an engagement portion between the rotary disc shaft and the rotor central shaft is provided with a sleeve in a cylindrical shape; and
the sleeve is fixedly sleeved on an outer periphery of the first semi-cylindrical shaft head, or fixedly sleeved on an outer periphery of the second semi-cylindrical shaft head.

7. The spherical pump and motor assembly according to claim 1, wherein the lower end of the rotary disc shaft is configured as a first cylindrical shaft head; the upper end of the rotor central shaft is configured as a second cylindrical shaft head; and a sleeve is provided on an outer periphery of an engagement portion between the lower end of the rotary disc shaft and the upper end of the rotor central shaft;
the sleeve is configured to be held on the first cylindrical shaft head and the second cylindrical shaft head through an interference fit; and
the lower end of the rotary disc shaft is in rotatable fit with the upper end of the rotor central shaft through the sleeve.

\* \* \* \* \*